United States Patent [19]
Fowler

[11] 3,744,455
[45] July 10, 1973

[54] CABLE AVIARY STRUCTURE AND METHOD OF ERECTING THE SAME

[76] Inventor: James M. Fowler, 1837 N. Hudson St., Chicago, Ill. 60614

[22] Filed: Nov. 1, 1971

[21] Appl. No.: 194,290

[52] U.S. Cl. ................................................. 119/17
[51] Int. Cl. ............................................ A01k 31/06
[58] Field of Search .............................. 119/17, 15; 135/14 V, 5 R; 43/20, 21, 31

[56] References Cited
UNITED STATES PATENTS
1,856,658  5/1932  Rummler ........................ 135/14 V
1,900,274  3/1933  Brockie ............................. 135/5 R Primary Examiner—Hugh R. Chamblee
Attorney—Max Dressler, James W. Clement et al.

[57] ABSTRACT

A large aviary structure in which the natural habitat of the birds housed therein can be realistically simulated, with the confining walls and roof of the structure being so unobtrusive and so well camouflaged as to produce in the visitor to the aviary the illusion that the birds are not artificially confined at all but are free to fly wherever they desire.

The side walls and roof of the structure are formed of a light weight, open mesh material that is preferably gray-green in color and adapted to have vines grow upon the mesh. The roof and side walls are supported by a relatively small diameter roof-defining cable, which is surrounded by a roof-supporting framework of catenary cables of relatively larger diameter, which framework surrounds and is spaced above and outside the roof-defining cable. Various combinations of catenary cables that form roof-supporting frameworks are disclosed.

Typically, the roof-supporting catenary cable framework is in turn supported by more or less vertical support poles. The distance separating the roof-defining cable from the catenary cable framework and the support poles renders the cable framework and poles virtually unnoticeable to one standing inside the aviary structure.

The side walls are preferably inclined outwardly from the bottom to top of the aviary structure.

A method of erecting the cable aviary structure is also disclosed.

32 Claims, 16 Drawing Figures

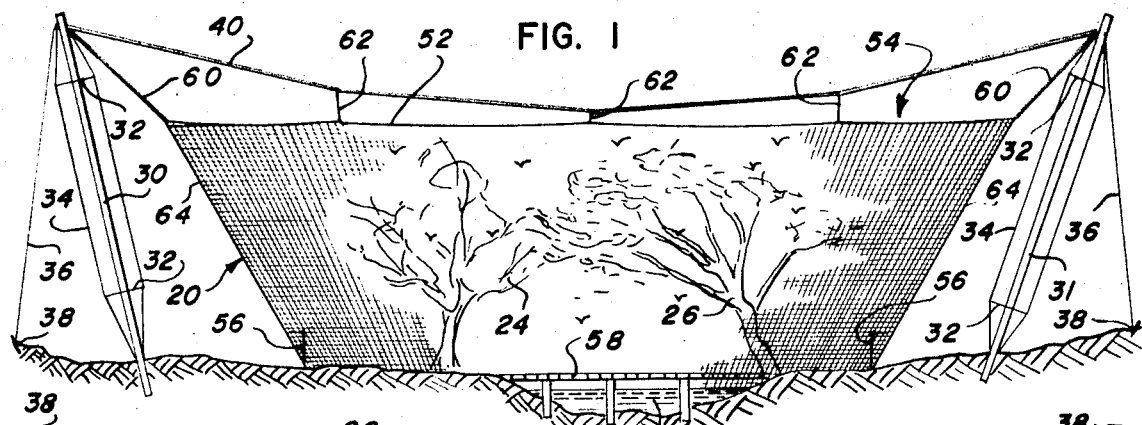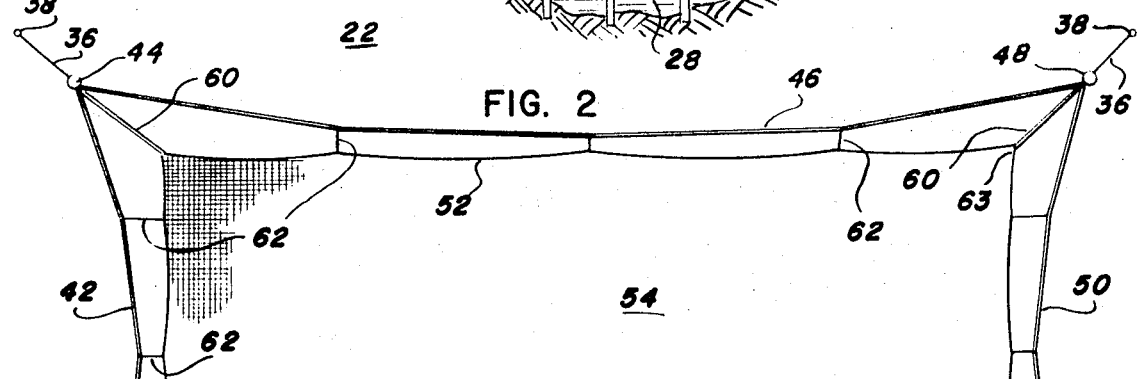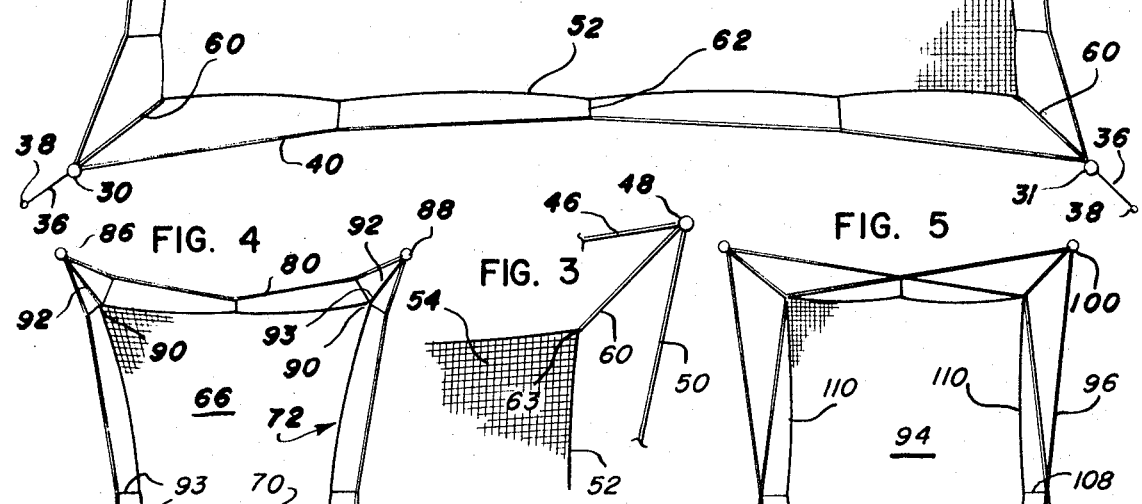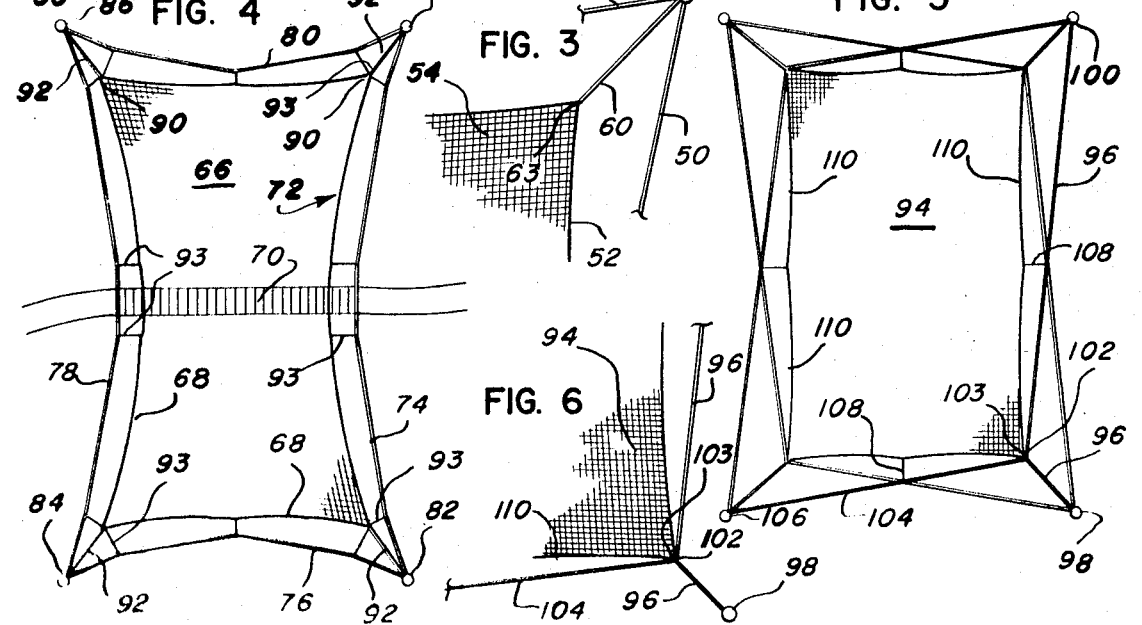

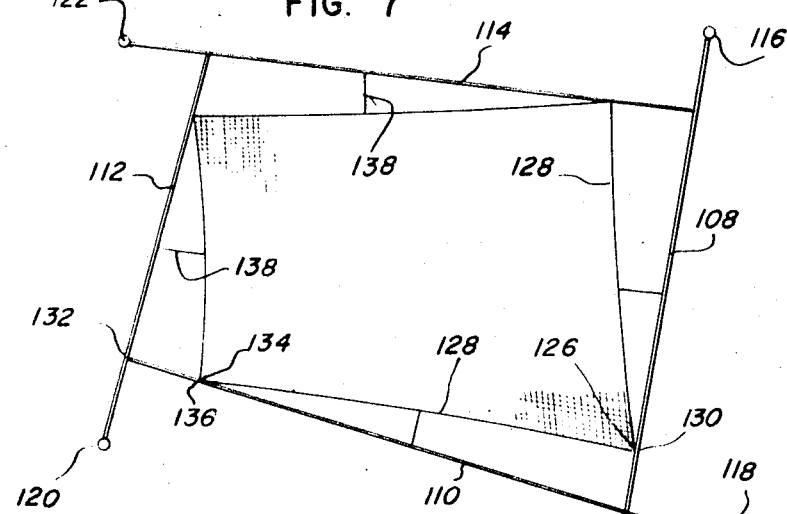
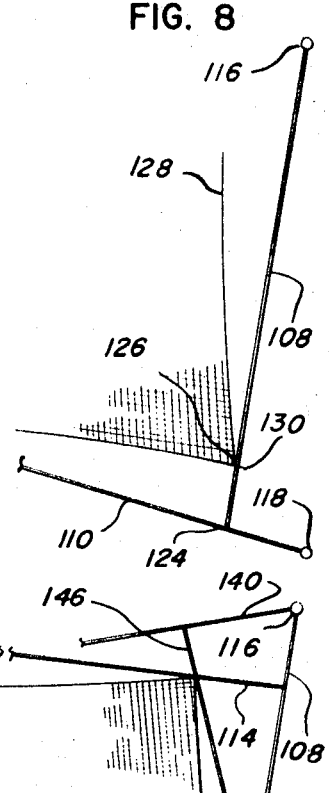
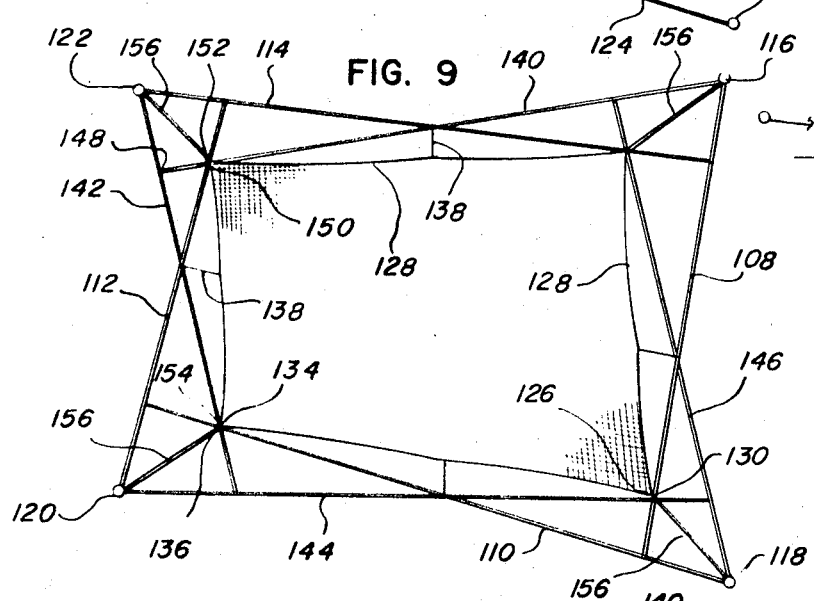
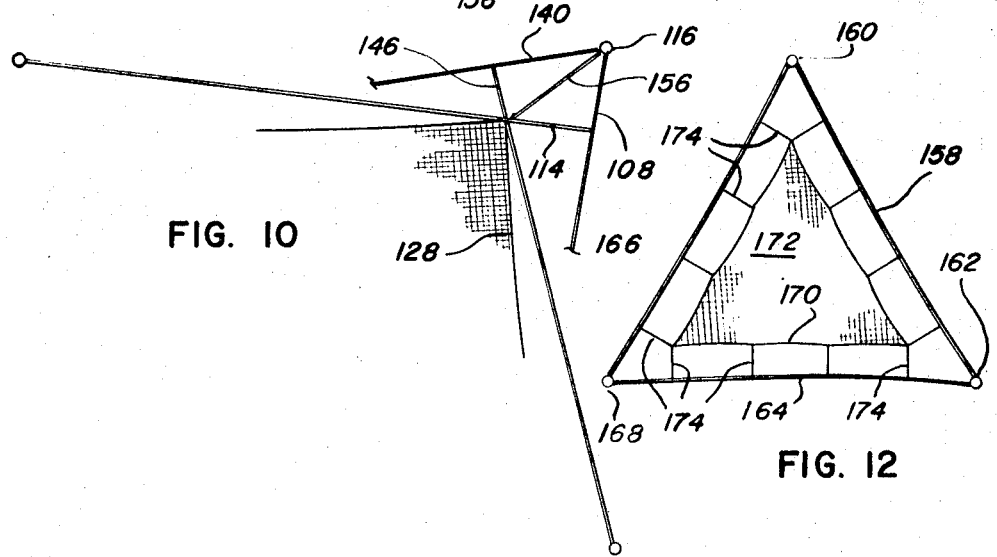

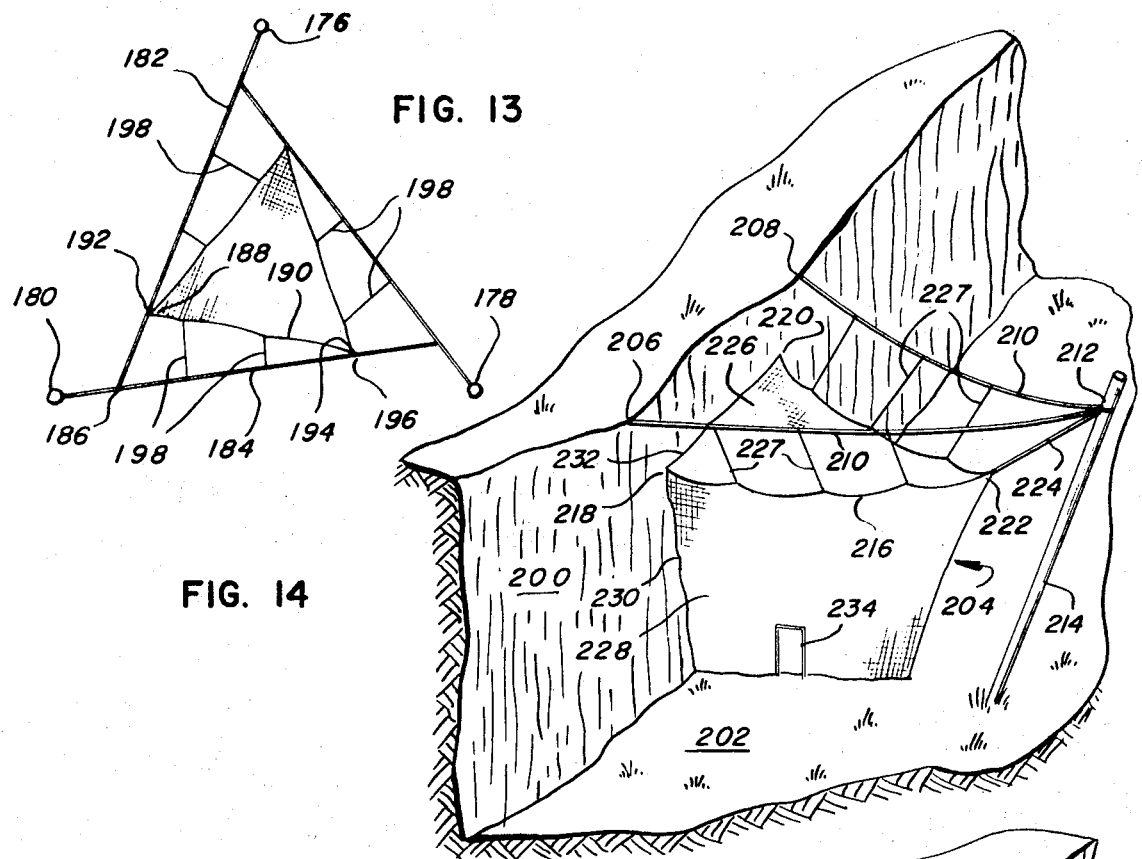
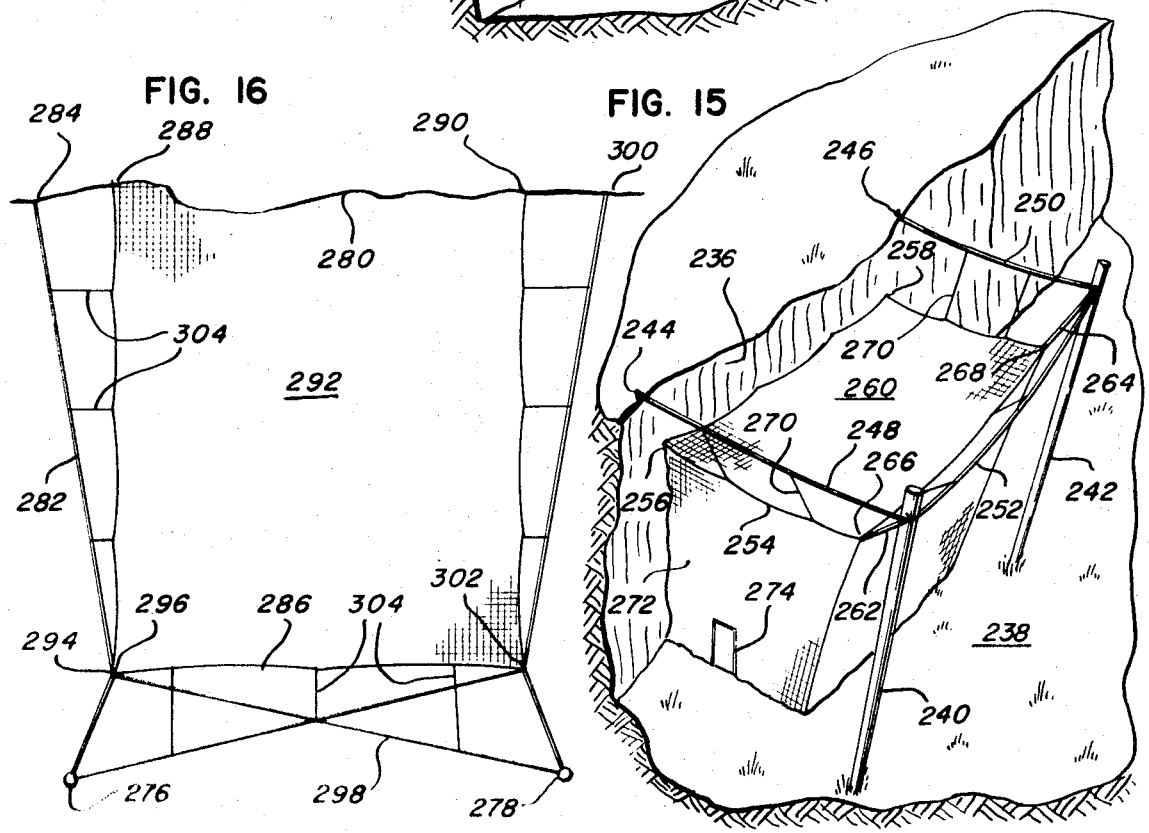

CABLE AVIARY STRUCTURE AND METHOD OF ERECTING THE SAME

This invention relates to a cable aviary structure in which the natural habitat of the birds housed in the structure can be realistically simulated, and in particular such a structure in which a roof-supporting framework of catenary cables suspended from support poles is spaced above and outside the mesh walls and roof of the structure, so that the illusion of the birds' natural habitat is heightened for the observer who is in the interior of the structure viewing the birds. This invention also relates to a method of erecting such an aviary structure.

BACKGROUND OF THE INVENTION

It has long been recognized that by far the most desirable type of building or other structure for use in a public zoo is one that simulates as closely as possible the natural habitat of the animals or birds housed in the zoo. In the case of birds, this objective has been especially difficult to achieve because of the necessity of confining the flight of the birds so that they will not be free to fly away. Specifically, it has been difficult to provide confining walls and a roof that will somehow blend into the surroundings and not detract from an illusion of open space.

DISADVANTAGES OF THE PRIOR ART

One way to help produce the illusion that there are no confining walls or roof in a zoo aviary is to make the aviary as large as possible, so that the confining barriers to the birds' flight will not be so noticeable. However, the larger the structure is, the stronger — and therefore in prior art aviaries, the more noticeable — the supporting framework must be. In addition, the larger the structure, the greater the cost of erecting the aviary. These disadvantages of known types of structure for zoo aviaries are avoided by the present invention.

Other disadvantages of known aviaries are also avoided by the aviary structure of this invention. Birds instinctively alight upon perches that are offered by noticeable horizontal members, such as cross braces in a rigid supporting framework, with the result that a number of birds may congregate on such a horizontal member in a manner that will tend to emphasize rather than diminish for the observer the feeling of artificial confinement of the birds within the aviary. Since the aviary of the present invention includes no such horizontal members, the birds in this aviary will tend to alight upon the trees and bushes within the aviary space, or to alight more or less at random up and down the open mesh material of which the side walls of the structure are formed.

Another disadvantage of employing horizontal structural members that is avoided by the present invention is that when a confining wire screen is attached to such a structural member, the bird that is attracted to alight upon the horizontal member cannot do so without damaging itself against the wire screen.

Most aviaries now known have vertical side walls, which causes two types of damage to the birds in the aviary when they alight upon such a wall formed of mesh material, or fly into the wall. The first type of damage may occur to the bird's tail feathers when it alights on a vertical side wall, as it seeks to hang on to the mesh by its claws and tends to tip back out of balance. It might be supposed that such damage to the bird's tail feathers could be avoided by inclining the side walls of the aviary inwardly from the bottom to the top of the walls, and this type of structure is in fact employed in some zoo aviaries. Surprisingly, it has been found that there is actually less damage to tail feathers of birds alighting upon the aviary side walls if the walls are inclined in just the opposite direction, that is, outwardly from the bottom to the top of the walls, as in the preferred form of this invention. Apparently the explanation for this is that the bird is better able to maintain its balance on such an inclined wall, and thus is less likely to tip over and have its tail feathers strike the meshed wall and thereby suffer damage.

The second type of damage produced by the vertical walls of known aviaries results from collisions of the confined birds with the side walls. Such collisions may occur if a bird panics because of the sudden flight of another bird, the presence of the birds' keeper, or some other outside cause. Collisions may also occur because a bird instinctively flies against any wind it may feel blowing through the aviary, or because the bird may simply not yet be used to being confined. Collisions with the side walls may cause damage to the bird's cere (the fleshy member at the base of the bill), or in extreme cases may even cause the bird's neck to be broken. It has been found that birds are more likely to swoop down and alight safely upon a side wall that is outwardly inclined from bottom to top in accordance with the preferred teaching of this invention, and are thus less likely to suffer in this aviary the damaging collisions that often occur with the vertical side walls of prior art aviary structures.

The use of side walls inclined outwardly from the bottom to the top of the aviary structure in the preferred embodiment of this invention has the added advantage that the upward flight of the birds is encouraged, since birds tend by instinct to fly in ever wider upward spirals. Thus, the wasted space at the top of prior art aviaries in which the side walls are inclined inwardly from bottom to top is avoided by the present invention.

SUMMARY OF THE AVIARY STRUCTURE OF THIS INVENTION

The cable aviary structure of this invention includes at least three support members — which are typically more or less vertical support poles — elevated above the ground. Each support member has at least one catenary cable associated with it. The catenary cable has one end secured to the elevated support member, and its other, or remote, end secured to the next adjacent arrangement of an elevated support member with a catenary cable secured thereto. The remote end of the first mentioned cable may be secured either directly to the next adjacent elevated support member, or to another catenary cable that is in turn secured to that support member.

In the resulting framework of catenary cables, all the cables are inclined inwardly and downwardly into the space bonded by the elevated support members and the surface of the ground directly beneath those elevated members, thus providing a roof-supporting framework within that space.

In this specification and in the claims, the term "catenary" is employed to refer not only to the curved shape assumed by a freely hanging cable of uniform density and cross section, as in the traditional usage of the term, but also to cables that assume a roughly similar shape under the influence both of their own weight and of the weight of other support cables, adjustment cables, and similar members that go to make up the cable aviary structure.

Within the space bonded by the catenary cable framework just described, and by the surface of the ground directly beneath that framework, is supported a cable defining the perimeter of the roof of the aviary structure. Spaced portions of this roof-defining cable are secured to and supported by the catenary cable framework.

A roof formed of open mesh material is in turn supported upon the roof-defining cable. Side walls which are likewise formed of open mesh material extend downward to the ground from the roof. For the reasons indicated above, the side walls of the structure are preferably inclined outwardly from the bottom to the top of the aviary.

In a preferred form of this structure, a plurality of adjustment cables is used to secure the roof-defining cable to the cables of the roof-supporting framework, and to help maintain each segment of the roof-defining cable as nearly straight as possible.

SUMMARY OF THE METHOD OF THIS INVENTION

In the method of this invention, after a roof-supporting framework of catenary cables is suspended from elevated support members, a closed loop of cable having a perimeter equal to the perimeter of the roof to be erected is raised to an elevated position below the cable framework and within the space bounded by the surface of the ground and the framework. (In some embodiments of this invention, a bluff or cliff is substituted for one segment of the roof-defining cable.) Spaced portions of the roof-defining cable are then secured to the roof-supporting framework to arrange the roof-defining cable preferably in the general shape of a polygon.

Successive panels of mesh material are then pulled over the roof-defining cable on one side of the generally polygonal area outlined by the latter cable, and across to the opposite side of that area. This defines a portion of the walls and roof of the aviary structure being erected. Each successive panel is then pulled over and draped down below the roof-defining cable on the opposite side to form another portion of the side wall of the aviary structure.

Finally, the edge portions of the panels of mesh material are secured to each other, and to the ground, to form an enclosed aviary.

BRIEF DESCRIPTION OF THE DRAWINGS

FIG. 1 is a side elevational view of one embodiment of the cable aviary structure of this invention.

FIG. 2 is a top plan view of the embodiment of FIG. 1.

FIG. 3 is a fragmentary view of the upper right-hand portion of the embodiment of FIG. 2.

FIG. 4 is a top plan view of another embodiment of the cable aviary structure of this invention.

FIG. 5 is a top plan view of another embodiment of the aviary structure of this invention.

FIG. 6 is a fragmentary view of the lower right-hand portion of the embodiment of FIG. 5.

FIG. 7 is a top plan view of another embodiment of the structure of this invention.

FIG. 8 is a fragmentary view of the lower right-hand portion of the embodiment of FIG. 7.

FIG. 9 is a top plan view of a modification of the embodiment of FIG. 7.

FIGS. 10 and 11 are fragmentary views of the upper right-hand portion of the embodiment of FIG. 9.

FIGS. 12 and 13 are top plan views of other embodiments of the structure of this invention.

FIGS. 14 and 15 are perspective views of other embodiments of the aviary structure of this invention, in both of which a bluff or cliff is employed as one side wall of the structure.

FIG. 16 is a top plan view of another embodiment of the aviary structure of this invention in which a bluff is utilized as one side wall of the structure.

CATENARY CABLES FROM POLE TO POLE

FIGS. 1 through 6 illustrate embodiments of the aviary structure of this invention in which catenary cables extend between adjacent support poles, with the ends of each cable secured directly to the poles.

In FIG. 1, cable aviary structure 20 is erected upon ground 22 so as to enclose existing trees 24 and 26, and to span existing stream 28. The structure is basically supported by four elevated support members in the form of support poles such as poles 30 and 31, each of which is braced by transverse members 32 and bracing wires 34. External guy wires 36 are secured to the ground at 38 to help hold support poles 30 and 31 in place against the inward and downward force exerted by the weight of the rest of the aviary structure. The upper portions of support poles 30 are preferably slanted outward, at least in their upper portions, in order to put the poles under as much compression as possible. In the embodiment shown, the poles are tilted outward along their entire lengths.

Catenary cable 40, having a relatively large diameter, extends from the upper portion of support pole 30 on the left-hand side of FIG. 1 to support pole 31 on the right-hand side of FIG. 1, and is secured at its respective ends to said two support poles. Similar catenary cable 42 extends from support pole 30, to which it is secured, into the plane of the paper in FIG. 1, with its other end secured to support pole 44 (best seen in FIG. 2). As is also seen from FIG. 2, catenary cable 46 extends from support pole 44 in the upper left-hand portion of this figure to support pole 48 in the upper right-hand portion, with its ends secured to those respective poles. Similarly, catenary cable 50 extends between support poles 48 and 31, with its ends secured to those respective poles.

Catenary cables 40, 42, 46 and 50 are all inclined inwardly and downwardly into the space bounded by support poles 30, 44, 48 and 31 and the surface of ground 22 lying directly beneath the area defined by the top portions of those support poles. The catenary cables form a closed roof-supporting framework disposed within that space.

Cable 52, which is of a smaller diameter than catenary cables 40, 42, 46 and 50, defines the perimeter of roof 54. Cable 52 is located within the space bounded by the catenary cable framework already described and the surface of the ground lying directly beneath that framework.

Within the practical limits imposed by the available ground area, as well as by the strength, weight and cost of the construction materials employed, support poles 30, 44, 48 and 31 and the catenary cable framework suspended therefrom should be located as far as possible outside the space that is enclosed within the aviary. The farther these structural elements are outside the mesh walls and mesh roof of the aviary structure, the less noticeable they will be from the interior of the aviary.

Roof 54 is supported upon roof-defining cable 52. The roof is formed of light weight, open mesh material. The material may suitably be fabricated of plastic coated wire, or of nylon, of about one-sixteenth inch diameter. For best results it should be gray-green in color, although green, brown or tan colors may also be used satisfactorily. To produce the greatest illusion of the absence of confining walls or roof, creeping vines may be trained to grow upward along the walls and across the roof of the aviary structure.

One advantage of the aviary structure of this invention is that it may be erected without disturbing the natural foliage already present at the location where the aviary structure is to be constructed. Thus the visitor to the aviary may enter at one of swinging doors 56, then walk through the area enclosed by the aviary structure, across foot bridge 58, and out the other swinging door 56, all the while receiving as his main impression the appearance of birds flying around unconfined and in their natural habitat, as, for example, from tree 24 to tree 26.

The size of the openings in the mesh material of which the roof and side walls are formed will depend, of course, upon the size of the birds housed in the aviary. The mesh size may be as small as one-half inch or even less for some birds, and as large as perhaps three inches across for very large birds.

In the embodiment of FIGS. 1 and 2, roof-defining cable 52 is supported in its elevated position in part by support cables 60 extending from each corner of the generally polygonal structure formed by the roof-defining cable. Each support cable is secured to the corner of roof 54 at one end, and to its respective support pole 30, 44, 48 or 31 at the other end. Support cables 60 are of a relatively large diameter, and may have a diameter comparable to the diameter of catenary cables 40, 42, 46 and 50.

Roof-defining cable 52 and roof 54 are also supported by a plurality of adjustment cables 62 which extend from each side of the generally polygonal structure formed by roof-defining cable 52 to one of the catenary cables of the roof-supporting framework. Adjustment cables 62 are of relatively small diameter, and may have a diameter comparable to that of roof-defining cable 52 or smaller. The length of each adjustment cable 62 is preferably selected to maintain each side of the generally polygonal shape of roof 54 as nearly a straight line as possible. If adjustment cables 62 are sufficient in number and location, support cables 60 may be omitted, and roof-defining cable 52 is then suspended from the support poles of the aviary structure only through the catenary cable framework already described.

The importance of keeping the lines defining the various sides of the generally polygonally shaped roof of the aviary structure of this invention as nearly straight as possible is twofold. First, with each segment of roof-defining cable 52 kept as nearly straight as possible, it is much easier to install in place the panels of open mesh material of which roof 54 and sidewalls 64 are typically formed. Mesh or net materials do not adapt easily to crooked or curved cable segments, and for this reason the straighter the lines defining the perimeter of the roof, the more evenly the panels of mesh material can be installed. Second, because of the more even, regular installation of the mesh material, there is a more efficient, and thus more economical, use of that material.

The sides of polygonal roof 54 are maintained in very nearly straight lines not only by use of adjustment cables 62, but also by the effect of the weight of roof-defining cable 52 and the mesh material that forms roof 54 and the side walls of the aviary structure. The weight referred to acts to produce a "hinge" effect about the top of each support pole, as for example pole 48 in the upper right-hand corner of FIG. 2 and in FIG. 3. As indicated in FIG. 3, one portion of the hinge is provided by support cable 60, with other portions being provided by catenary cables 46 and 50 and their associated adjustment cables 62 which are attached near corner portion 63 of roof 54. The result of the hinge effect referred to is to cause each corner of roof 54 to be stretched outwardly away from the other three corners, with a noticeable straightening being produced in each segment of roof-defining cable 52.

Side walls 64, formed of a mesh material similar to that of which roof 54 is constructed, are shown in FIG. 1 inclining outward from the bottom to the top of the aviary structure. In the embodiment illustrated, side walls 64 are inclined at an angle of approximately 60° to the surface of ground 22. It is preferred that the angle of inclination to the ground be from about 50° to about 70°, and the best results are obtained when the angle is, as shown, approximately 60°.

In addition to having the advantages already described above, the outwardly inclined side walls of the aviary structure of this invention help in two ways to handle the problem of maintenance of the aviary. With the prior art aviaries having vertical side walls, the droppings from birds that have alighted upon the side walls tend to foul the mesh material of the walls, and render very difficult the problem of keeping those walls sufficiently clean for purposes both of sanitation and appearance. In prior art aviary structures having side walls inclined inwardly from the bottom to the top of the walls, droppings from birds that have alighted momentarily on those side walls fall within the enclosed space of the aviary, which increases the hazard to visitors and the disturbance to the birds when the droppings are removed.

In contrast to this, with the inclined walls of the aviary structure of the present invention, the droppings fall outside the aviary in areas from which visitors can be barred, and the droppings can be removed by maintenance personnel much more conveniently and with less disturbance to the birds. By the same token, unsightly fouling of the mesh material of the side walls can be largely avoided.

FIG. 4 illustrates in plan view an embodiment of the aviary structure of this invention generally similar to the embodiment shown in FIG. 2, but with the shape of roof 66, as outlined by roof-defining cable 68, being in the approximate configuration of an hourglass. This has the advantage that as the visitor to the aviary proceeds along walkway 70, side walls 72 diverge outwardly in the direction the viewer looks, and are thus less noticeable and distracting to him.

In the embodiment of FIG. 4, the catenary cable roof-supporting framework is provided by cables 74, 76, 78 and 80. The respective ends of these cables are secured to support poles 82, 84, 86 and 88. (Bracing and guy wires for the support poles are omitted for clarity from FIG. 4 and succeeding figures of the drawing.) The corners 90 of roof 66 are supported by support cables 92 secured thereto at one end and to their respective support poles at the other. Roof-defining cable 72 is also secured to the resulting catenary cable framework by adjustment cables 93.

FIG. 5 illustrates an embodiment of the aviary structure of this invention in which each corner of roof 94 is supported by two catenary cables. For example, the corner of the roof in the lower right-hand portion of FIG. 5 is supported by catenary cable 96 that extends between support pole 98 immediately adjacent that corner and support pole 100 in the upper right-hand corner of the figure, with the ends of cable 96 secured to the respective support poles. Intermediate portion 102 of cable 96 is secured to corner 103 of roof 94.

Second catenary cable 104 extends from corner 103 to support pole 106 in the lower left-hand corner of FIG. 5. One end of cable 104 is secured to corner 103 and the other end to pole 106. Suitable adjustment cables 108, secured at one end to catenary cables 96 and 104, respectively, and at the other end to roof-defining cable 110, help to maintain the sides of roof 94 as nearly straight as possible.

As seen from FIG. 6, the "hinge" effect at the lower right-hand corner of FIG. 5 that helps to keep roof-defining cable 110 as nearly straight as possible is provided by the two segments of catenary cable 96 and by catenary cable 104.

CATENARY CABLES FROM A POLE TO ANOTHER CATENARY CABLE

FIGS. 7 through 11 illustrate embodiments of the aviary structure of this invention in which each catenary cable extends from a support pole to which it is secured at one end, to an intermediate portion of another catenary cable to which it is secured at the other end. The second catenary cable is similarly connected at one end to a support pole, and at the other end to a third catenary cable, with this arrangement of a support pole and catenary cables continued in the same way around the perimeter of the structure.

In the embodiment illustrated in FIG. 7, a catenary cable roof-supporting framework is provided by catenary cables 108, 110, 112 and 114. Cable 108 extends from support pole 116, in the upper right-hand corner of FIG. 7, generally toward support pole 118, which is located in a clockwise angular direction from pole 116 in that figure. Second catenary cable 110 extends from pole 118 generally toward pole 120, also located in a clockwise angular direction from pole 116. Catenary cables 108, 110, 112 and 114 all extend into the space bounded by the surface of the ground and the four support poles 116, 118, 120 and 122.

The end of first catenary cable 108 that is remote from support pole 116 is secured — at intermediate portion 124 of second catenary cable 110 — to the next adjacent arrangement of a support pole and catenary cable secured thereto. Corner 126 of roof-defining cable 128 is secured to intermediate portion 130 of catenary cable 108.

The end of catenary cable 110 remote from support pole 118 is likewise secured — at intermediate portion 132 of catenary cable 112 — to its next adjacent arrangement of a support pole and catenary cable secured thereto. Corner 134 of roof-defining cable 128 is secured to intermediate portion 136 of cable 110.

Similar catenary cable arrangements are provided at each corner of the generally polygonal structure formed by roof-defining cable 128.

As is seen from FIG. 8, the "hinge" effect at corner 126 of roof-defining cable 128 is provided in this embodiment by cables 108 and 110, which tend to swing downward from the top portions of support poles 116 and 118, respectively. Adjustment cables 138 help to keep the sides of the trapezoidal structure outlined by roof-defining cable 128 as nearly straight as possible.

FIG. 9 shows a modification of the embodiment of the aviary structure illustrated in FIG. 7, in which a second framework of catenary cables extending in an opposite angular direction is employed to provide a more balanced structure.

In the embodiment of FIG. 9, catenary cables 108, 110, 112 and 114 are supplemented by catenary cables 140, 142, 144 and 146. In addition to first catenary cable 108 and second catenary cable 110 which extend in a clockwise angular direction from support pole 116, the embodiment of FIG. 9 includes third catenary cable 140 extending from support pole 116 generally toward support pole 122 in a counterclockwise angular direction, with one end of cable 140 secured to pole 116. Fourth catenary cable 142 extends from support pole 122 generally toward pole 120, likewise in a counterclockwise angular direction from pole 116. The end of third catenary cable 140 remote from support pole 116 is secured — at intermediate portion 148 of fourth catenary cable 142 — to the next adjacent arrangement of a support pole and catenary cable secured thereto.

Catenary cables 140, 142, 144 and 146 all extend into the space bounded by the surface of the ground and the respective support poles to which one end of each cable is secured.

Corner 150 of the generally polygonal structure formed by roof-defining cable 128 is secured to intermediate portion 152 of third catenary cable 140, and to intermediate portion 148 of catenary cable 112. In the same way, corner 134 of roof-defining cable 128 is secured not only to intermediate portion 136 of second catenary cable 110, as already described above, but also to intermediate portion 154 of fourth catenary cable 142.

Similar catenary cable arrangements are provided at each corner of the aviary structure.

Support cables 156 are secured to their respective support poles at one end, and at the other end to the nearest corner of the generally polygonal structure formed by roof-defining cable 128.

As is seen from FIG. 10, the "hinge" effect at support pole 116 in the upper right-hand corner of the embodiment of FIG. 9 is provided by an arrangement of cables that includes 146, 140, 156, 108 and 114. A similar hinge arrangement, but with support cable 156 omitted, is shown in FIG. 11.

THREE ELEVATED SUPPORT MEMBERS

FIGS. 12 and 13 illustrate embodiments of the aviary structure of this invention in which only three elevated support members are employed In FIG. 12, catenary cable 158 has one end secured to elevated support member 160 and the other to elevated support member 162. Catenary cables 164 and 166, with their ends secured to support poles 162 and 168, respectively, complete the catenary cable closed roof-supporting framework of this embodiment. The three catenary cables extend inwardly toward each other and downwardly toward the surface of the ground.

Roof-defining cable 170 defines a triangular roof 172 of open mesh material. Spaced portions of roof-defining cable 170 are secured by adjustment cables 174 to the catenary cable framework. The adjustment cables also help to maintain the sides of roof 172 as nearly straight as possible.

In the embodiment of FIG. 13, three elevated support members 176, 178 and 180 are employed. First catenary cable 182 extends from elevated support member 176 generally toward support member 180 in a counterclockwise angular direction, and into the space bounded by the three elevated support members and the surface of the ground directly beneath those support members. One end of cable 182 is secured to support member 176.

Second catenary cable 184 extends from elevated support member 180 generally towards elevated support member 178, likewise in a couterclockwise angular direction and into the space bounded by the three elevated support members and the surface of the ground directly beneath those support members. One end of cable 184 is secured to elevated support member 180. The end of catenary cable 182 remote from support member 176 is secured — at intermediate portion 186 of second catenary cable 184 — to the next adjacent arrangement of a support pole and catenary cable secured thereto.

Corner 188 of the triangular structure formed by roof-defining cable 190 is secured to intermediate portion 192 of first catenary cable 182. Corner 194 of the triangular structure of cable 190 is secured to intermediate portion 196 of second catenary cable 184.

Similar arrangements of catenary cables are provided at each corner of the aviary structure.

Adjustment cables 198 help to maintain each side of the trangular structure outlined by roof-defining cable 190 as nearly straight as possible.

BLUFF USED AS SIDE OF STRUCTURE

FIGS. 14 through 16 illustrate embodiments of the aviary structure of this invention in which a bluff or cliff is employed as one side of the structure.

In FIG. 14, bluff 200 rises sharply above ground 202, with the aviary structure 204 of this invention extending in front of the bluff so that the rising cliff can be utilized as the rear wall of the aviary.

Elevated support members 206 and 208 are secured to the top edge of bluff 200. Catenary cable 210 is secured at its respective ends to elevated support members 206 and 208, with an intermediate portion of the cable secured to the top portion of support pole 214. The two segments of catenary cable 210 between the elevated support members and support pole 214 incline inwardly toward each other and downwardly toward the ground. These two segments of the catenary cable thus form with bluff 200 a closed roof-supporting framework.

Roof-defining cable 216 is secured at each end to bluff 200, at points 218 and 220 located between and below elevated support members 206 and 208. Intermediate portion 222 of cable 216 is secured by support cable 224 to the top portion of support pole 214. Cable 216 thus defines, with bluff 200, the perimeter of roof 226 of aviary structure 204.

Adjustment cables 227 are secured at one end to catenary cable 210 and at the other end to spaced portions of roof-defining cable 216, to help support the latter and maintain it as nearly straight as possible.

Roof 226 is formed of light weight, open mesh material. A side wall formed of similar material extends downward to the ground from each side of roof 226 that is supported by a segment of cable 216 that connects elevated member 218 or 220 with support cable 224.

The aviary structure is completed by securing to bluff 200 the edge portions 230 of walls 228 and edge portion 232 of roof 226. Entry door 234 provides access to the interior of the aviary.

In FIG. 15, bluff 236 rises above ground 238, with support poles 240 and 242 rising from the ground at locations spaced from the bluff. Support members 244 and 246 are secured to bluff 236 at the top edge of the bluff.

Catenary cable 248 extends from elevated support member 244 to support pole 240, with the ends of the cable secured to respective members 244 and 240. Catenary cable 250 extends in the same way from elevated support member 246 to support pole 242. Catenary cable 252 extends from support pole 240 to pole 242, with its two ends secured to the respective support poles. All of said catenary cables 248, 250 and 252 incline inwardly toward each other and downwardly toward the ground. Thus they form, with bluff 236, a closed roof-supporting framework.

The ends of cable 254 are secured to bluff 236 at points 256 and 258, respectively, located between and below elevated support members 244 and 246. Cable 254 defines a portion of the perimeter of generally polygonally shaped roof 260 formed of light weight, open mesh material.

Support cables 262 and 264 secure corners 266 and 268, respectively, of the generally polygonal structure formed by roof-defining cable 254, to support poles 240 and 242. Spaced portions of roof-defining cable 254 are secured by means of adjustment cables 270 to the catenary cable framework comprised of cables 248, 250 and 252.

Roof 260 is supported on its respective sides by roof-defining cable 254 and bluff 236. A side wall 272 formed of light weight, open mesh material extends downward to the ground from roof 260 along each side of the roof that is supported by cable 254.

The aviary structure is completed by securing to bluff 236 the edge portions of roof 260 and of the side walls which are adjacent the bluff. Entry is provided into the aviary through door 274.

FIG. 16 provides a plan view of another embodiment of the aviary structure of this invention in which a bluff forms one side of the structure.

Support poles 276 and 278 are located in front of and spaced from bluff 280. Catenary cable 282 is secured at one end to the elevated support member 284 on bluff 280, and at the other end to the top portion of support pole 276.

Cable 286 has one end secured to bluff 280 at point 288 and the other end at point 290 on the bluff, which points lie below elevated support member 284. Cable 286 defines a portion of the perimeter of generally polygonally shaped roof 292, which is formed of light weight, open mesh material.

Intermediate portion 294 of catenary cable 282 is secured to corner 296 of roof 292. Second catenary cable 298 is secured at one end to corner 296 of the roof and at its other end to the top portion of support pole 278, which is immediately adjacent pole 276.

A similar arrangement of catenary cables is provided to extend between elevated support member 300 on bluff 280 and support poles 278 and 276, respectively, to provide support for corner 302 of roof 292. All the catenary cables extending around aviary roof 292 incline inwardly toward each other and downwardly toward the ground, to form with bluff 280 a roof-supporting framework.

Adjustment cables 304 are secured at one end to roof-defining cable 286 and at the other to the respective cables of the roof-supporting framework just described. By means of these adjustment cables, the sides of the generally polygonal structure formed by roof-defining cable 286 are maintained as nearly straight as possible.

METHOD OF ERECTING AVIARY STRUCTURE

The method used in accordance with this invention to erect an aviary structure achieves two important advantages that have not previously been available with known methods of erection of aviary structures.

In the first place, the simplicity of the method of construction and the efficient, economical use of readily available building materials provides a very great savings in cost. It has been found that the cost of the cable aviary structure of this invention is one-tenth or less of the cost for a conventional aviary enclosing the same volume of space, and requires only a fraction of the time to erect.

A second important advantage in the present method of erection of an aviary structure is that supporting the roof-defining cable upon the catenary cable roof-supporting framework as described above maintains the various segments of the roof-defining cable in very nearly straight lines. This greatly simplifies the pulling of wire mesh or screen material over the roof-defining cable to form the roof and walls of the aviary structure.

Erection of the aviary structure of FIGS. 1 and 2 exemplifies the method of this invention. Modifications in the method will be made, of course, depending upon the specific catenary cable roof-supporting framework that is to be constructed.

In the embodiment of FIGS. 1 and 2, support poles 30, 44, 48 and 31 are erected on ground 22 at each corner of a generally rectangular area that is somewhat larger than the area to be utilized for the aviary.

In the erection of a typical aviary structure, similar to that shown in FIG. 1, by utilization of the method of this invention, the roof of the structure was approximately 140 feet long and the bottom of the structure was approximately 110 feet long, which dimensions produced a suitable outward inclination from the bottom of the end walls to the top of those walls approximately 40 feet above the ground. The bottom of each 60 feet support pole was positioned generally below the projected location of one of the roof corners, and the pole was inclined outwardly at an angle of approximately 70° to the surface of the ground measured in both the longitudinal and lateral directions.

It will be noted that roof 66 of the embodiment of FIG. 4 may be considered to have in practical effect a six-sided shape, with the left-hand and right-hand sides in the showing of FIG. 4 having a shallow V-shape comprised of two more or less straight segments. Thus it is seen that in erecting a cable aviary structure by the method of this invention, it may not be necessary to employ as many support poles as there are sides to the generally polygonally shaped roof of the structure. It will always be necessary, of course, to use an elevated support member, such as a support pole, at each of the outside corners of the polygonally shaped roof which it is proposed to erect.

If external bracing of each support pole is to be employed, bracing members 32 and wires 34 are ordinarily installed in place before the pole is erected. Preferably, each pole is inclined diagonally outwardly from the area for the proposed aviary, with guy wires 36 secured to anchor members 38 embedded in the ground.

In the next step of the method of this invention, catenary cables 40, 42, 46 and 50 are secured at their respective ends to the tops of the indicated support poles. This forms a closed roof-supporting framework disposed within the space bounded by the surface of ground 22 and the support poles.

A closed loop of cable is next selected having a perimeter equal to the perimeter of the roof of the aviary to be erected. This closed loop is then raised to an elevated position below the catenary cable framework just described, and within the space bounded by that framework and the surface of the ground directly beneath the framework.

The cable of which the roof-defining closed loop is formed may be of a relatively small diameter compared to the catenary cables of which the roof-supporting framework is constructed. The roof-defining cable may be, for example, approximately one-quarter to three-eighths inch in diameter, while the catenary cables may be approximately one-half to three-quarters inch in diameter.

Spaced portions of roof-defining cable 52 are next secured through support cables 60 to the four support poles. The spaced portions of cable 52 are selected at points that will produce a substantially rectangular shape in cable 52 when it is raised in place. Support cables 60 may be of relatively large diameter, similar to catenary cables 40, 42, 46 and 50.

With roof-defining cable 52 located in a generally rectangular position, the sides of the rectangle are made straighter by installing at spaced portions of each side of cable 52 adjustment cables 62 secured at one end to the roof-defining cable, and at the other end to one of the cantenary cables of the roof-supporting framework. The adjustment cables may be of relatively small diameter such as cable 52, or somewhat smaller if desired.

When roof-defining cable 52 has been thus positioned, a panel of light weight, open mesh material is pulled from a roll of such material up over roof-defining cable 52 on one side of the rectangular roof area outlined by the cable. The panel is pulled across to the opposite side of the roof area, and is then pulled still farther in order to drape it down over roof-defining cable 52 on the opposite side of the area described.

The panel of mesh material employed may be, for example, four feet to six feet wide. When pulled over the roof-defining cable in the manner indicated, it forms a portion of the walls and roof of the aviary structure being erected. The panel installation steps defined are then repeated, to bring additional panels of mesh material into place. The aviary structure is compled by securing the edge portions of the panels of mesh material that have been thus installed to edge portions of adjacent panels, and to the surface of the ground, to form an enclosed aviary.

The above detailed description has been given for clearness of understanding only. No unnecessary limitations should be understood therefrom, as modifications will be obvious to those skilled in the art.

I claim:

1. An aviary structure erected upon the ground which comprises: (1) at least four support poles; (2) at least one catenary cable for each of said support poles; (3) means for securing one end of each of said cables to the corresponding one of said support poles; (4) means for securing the other end of said cable to the next adjacent arrangement of one of said support poles with a catenary cable secured thereto, said catenary cables all inclining inwardly and downwardly into the space bounded by the surface of the ground and said support poles to form a closed roof-supporting framework disposed within said space; (5) a cable defining the perimeter of a roof, said perimeter having the general shape of a polygon, said roof-defining cable being located within the space bounded by said catenary cable framework and the surface of the ground directly beneath said framework; (6) means for securing spaced portions of said roof-defining cable to said catenary cable framework; (7) a roof formed of open mesh material, said roof being supported by said roof-defining cable; and (8) a side wall extending downward to the ground from each side of said polygonal roof, said side walls likewise being formed of open mesh material.

2. The aviary structure of claim 1 in which each of said catenary cables extends from one of said support poles to the next adjacent support pole, and each end of said cable is secured to its respective support pole.

3. The aviary structure of claim 2 in which a support cable extends from each corner of the generally polygonal structure formed by said roof-defining cable to one of said support poles, and one end of said support cable is secured to said corner and the other to said support pole.

4. The aviary structure of claim 2 in which at least one adjustment cable extends from each side of the generally polygonal structure formed by said roof-defining cable to one of the catenary cables of said roof-supporting framework, and one of each of said adjustment cables is secured to said side and the other to said framework cable.

5. The aviary structure of claim 2 in which each of said side walls inclines outwardly from the bottom to the top of said structure.

6. The aviary structure of claim 1 in which said one catenary cable associated with any given one of said poles extends between said given pole and a second support pole next adjacent thereto, which structure also includes (1) means for securing the respective ends of said cable to said support poles; (2) means for securing an intermediate portion of said cable to one corner of the generally polygonal structure formed by said roof-defining cable; (3) a second catenary cable extending from said corner at said intermediate point of said first catenary cable to a third support pole next adjacent said second support pole; and (4) means for securing one end of said second catenary cable to said corner and the other end thereof to said third support pole.

7. The aviary structure of claim 6 in which at least one adjustment cable extends from each side of the generally polygonal structure formed by said roof-defining cable to one of the catenary cables of said roof-supporting framework, and one end of said adjustment cable is secured to said side and the other to said framework cable.

8. The aviary structure of claim 6 in which each of said walls inclines outwardly from the bottom to the top of said structure.

9. The aviary structure of claim 1 in which said one catenary cable associated with any given one of said support poles extends from said given pole generally toward a second support pole next adjacent thereto in a given angular direction, and into the space bounded by the surface of the ground and all said support poles, which aviary structure also includes (1) means for securing one end of said one catenary cable to said given support pole; (2) a second catenary cable extending from said second support pole generally toward a third support pole next adjacent thereto in said given angular direction, and into the space bounded by the surface of the ground and all said support poles; (3) means for securing one end of said second catenary cable to said second support pole; (4) means for securing the other end of said one catenary cable to an intermediate portion of said second catenary cable; (5) means for securing one corner of the generally polygonal structure formed by said roof-defining cable to an intermediate portion of said first catenary cable; and (6) means for securing another of said corners to an intermediate portion of said second catenary cable.

10. The aviary structure of claim 9 in which at least one adjustment cable extends from each side of the generally polygonal structure formed by said roof-defining cable to one of the catenary cables of said roof-supporting framework, and one end of said adjustment cable is secured to said side and the other end thereof is secured to said framework cable.

11. The aviary structure of claim 9 in which each of said side walls inclines outwardly from the botom to the top of said structure.

12. The aviary structure of claim 9 which includes: (1) a third catenary cable extending from said given support pole generally toward a fourth support pole next adjacent thereto in an angular direction opposite said given angular direction, and into said space bounded by the surface of the ground and all said support poles; (2) means for securing one end of said third catenary cable to said given support pole; (3) a fourth catenary cable extending from said fourth support pole generally toward the support pole next adjacent thereto in said opposite angular direction, and into said space bounded by the surface of the ground and all said support poles; (4) means for securing one end of said fourth catenary cable to said fourth support pole; (5) means for securing the other end of said third catenary cable to an intermediate portion of said fourth catenary cable; (6) means for securing a corner of the generally polygonal structure formed by said roof-defining cable to an intermediate portion of said third catenary cable; and (7) means for securing another of said corners to an intermediate portion of said fourth catenary cable.

13. The aviary structure of claim 12 in which at least one adjustment cable extends from each side of the generally polygonal structure formed by said roof-defining cable to one of the catenary cables of said roof-supporting framework, and one end of said adjustment cable is secured to said side and the other end thereof is secured to said framework cable.

14. The aviary structure of claim 12 in which a short support cable extends from each support pole to the nearest corner of the generally polygonal structure formed by said roof-defining cable, and one end of said support cable is secured to said corner and the other end thereof is secured to said support pole.

15. The aviary structure of claim 12 in which each of said side walls inclines outwardly from the bottom to the top of said structure.

16. An aviary structure erected upon the ground which comprises: (1) at least four support poles; (2) at least one catenary cable for each of said support poles; (3) means for securing one end of each of said cables to the corresponding one of said support poles; (4) means for securing the other end of said cable either to another of said support poles or to another of said catenary cables, said catenary cables all inclining inwardly and downwardly into the space bounded by the surface of the ground and said support poles to form a closed roof-supporting framework disposed within said space; (5) a cable defining the perimeter of a roof, said perimeter having the general shape of a polygon, said roof-defining cable being located within the space bounded by said catenary cable framework and the surface of the ground directly beneath said framework; (6) means for securing spaced portions of said roof-defining cable to said catenary cable framework; (7) at least one adjustment cable extending from each side of the generally polygonal structure formed by said roof-defining cable to one of the catenary cables of said roof-supporting framework; (8) means for securing one end of said adjustment cable to said side; (9) means for securing the other end of said adjustment cable to said framework cable; (10) a roof formed of open mesh material, said roof being supported by said roof-defining cable; and (11) a side wall extending downward to the ground from each side of said polygonal roof, each of said side walls inclining outwardly from the bottom to the top of said structure, said side walls likewise being formed of open mesh material.

17. An aviary structure erected upon the ground which comprises: (1) at least three support members elevated above the ground; (2) at least one catenary cable for each of said elevated support members; (3) means for securing one end of each of said cables to the corresponding one of said elevated support members; (4) means for securing the other end of said cable to the next adjacent arrangement of one of said support members with a catenary cable secured thereto, said catenary cables all inclining inwardly and downwardly into the space bounded by said elevated support members and directly beneath the area defined by said elevated support members, to form a closed roof-supporting framework disposed within said space; (5) a cable defining the perimeter of a roof, said roof-defining cable being located within the space bounded by said catenary cable framework and the surface of the ground directly beneath said framework; (6) means for securing spaced portions of said roof-defining cable to said catenary cable framework; (7) a roof formed of open mesh material, said roof being supported by said roof-defining cable; and (8) side walls extending downward to the ground from said roof, said side walls likewise being formed of open mesh material.

18. The aviary structure of claim 17 in which a plurality of adjustment cables secures said roof-defining cable to the cables of said roof-supporting framework.

19. The aviary structure of claim 17 in which said side walls incline outwardly from the bottom to the top of said structure.

20. The aviary structure of claim 19 in which said side walls are inclined at an angle from about 50° to about 70° to the horizontal.

21. The aviary structure of claim 19 in which said side walls are inclined at an angle of about 60° to the horizontal.

22. The aviary structure of claim 17 in which the perimeter of the roof has the general shape of a polygon.

23. The aviary structure of claim 22 in which the perimeter of the roof has a shape approximately that of an hourglass.

24. The aviary structure of claim 17 in which said elevated support members are support poles.

25. The aviary structure of claim 24 in which said support poles are externally braced along their longitudinal axes and have their top portions braced by guy lines connected to the ground.

26. The aviary structure of claim 24 in which said support poles are inclined away from each other at least at their top portions.

27. An aviary structure erected upon the ground and having a bluff as one side of the structure, which comprises: (1) a support pole; (2) two support members secured to said bluff at elevated locations; (3) a catenary cable extending from one of said elevated support members to said support pole, and from there to the other of said elevated support members, the two segments of said catenary cable between said elevated support members and said support pole inclining inwardly toward each other and downwardly toward the ground, to form with the top portion of said bluff a closed roof-supporting framework; (4) means securing each end of said catenary cable to the respective one of said elevated support members; (5) means securing an intermediate portion of said catenary cable to said support pole; (6) a cable defining a portion of the perimeter of a roof, said roof-defining cable being located within the space bounded by said roof-supporting framework and the ground directly beneath said framework; (7) means for securing each end of said roof-defining cable to said bluff at respective points located between and below said elevated support members; (8) a support cable secured at one end to said support pole and at its other end to an intermediate portion of said roof-defining cable; (9) means for securing spaced portions of said roof-defining cable to said catenary cable framework; (10) a roof formed of open mesh material, said roof being supported on its respective sides by said roof-defining cable and said bluff; (11) a side wall formed of open mesh material extending downward to the ground from said roof along each side of said roof that is supported by said roof-defining cable; and (12)

means to secure to said bluff the portions of said roof and side walls which are adjacent the bluff.

28. An aviary structure erected upon the ground and having a bluff as one side of the structure, which comprises: (1) at least two support poles; (2) two support members secured to said bluff at elevated locations; (3) a catenary cable extending from each of said elevated support members to the one of said support poles in closest proximity thereto; (4) means securing one end of each of said catenary cables to its respective elevated support member and the other end to its respective support pole; (5) a catenary cable extending from each of said support poles to the next adjacent support pole, all said aforementioned catenary cables inclining inwardly toward each other and downwardly toward the ground to form, with the top portion of said bluff, a closed roof-supporting framework; (6) means securing the ends of each of said last named catenary cables to their respective support poles; (7) a cable defining a portion of the perimeter of a generally polygonally shaped roof, said roof-defining cable being located within the space bounded by said roof-supporting framework and the ground directly beneath said framework; (8) means for securing each end of said roof-defining cable to said bluff at respective points located between and below said elevated support members; (9) a support cable secured at one end to each support pole and at its other end to a corner of the generally polygonal structure formed by said roof-defining cable; (10) means for securing spaced portions of said roof-defining cable to said catenary cable framework; (11) a roof formed of open mesh material, said roof being supported on its respective sides by said roof-deining cable and said bluff; (12) a side wall formed of open mesh material extending downward to the ground from said roof along each side of said roof that is supported by said roof-defining cable; and (12) means to secure to said bluff the portions of the roof and of said side walls which are adjacent the bluff.

29. An aviary structure erected upon the ground and having a bluff as one side of the structure which comprises: (1) at least two support poles; (2) two support members secured to said bluff at elevated locations; (3) a first catenary cable extending between each of said elevated support members secured to said bluff and the one of said support poles in closest proximity thereto; (4) means for securing one end of said first catenary cable to its respective elevated support member; (5) means for securing the other end of said first catenary cable to its respective support pole; (6) a cable defining a portion of the perimeter of a generally polygonally shaped roof, each end of said cable being secured to said bluff at respective points located between and below said elevated support members, an intermediate portion of each of said first catenary cables being secured to one corner of the generally polygonal structure formed by said roof-defining cable, said roof-defining cable being located within the space bounded by said roof-supporting framework and the ground directly beneath said framework; (7) a second catenary cable secured at one end to said corner of said generally polygonal structure and at its other end to a second support pole next adjacent said closest support pole, all said aforementioned catenary cables inclining inwardly toward each other and downwardly toward the ground, to form with said bluff a roof-supporting framework; (8) a roof formed of open mesh material, said roof being supported on its respective sides by said roof-defining cable and said bluff; (9) a side wall extending downward to the ground from said roof along each side of said roof that is supported by said roof-defining cable; and (10) means to secure to said bluff the portions of the roof and of said side walls which are adjacent the bluff.

30. A method of erecting an aviary structure upon the ground which comprises: (1) positioning a support pole on the ground at each of the outside corners of a generally polygonally shaped area; (2) securing one end of at least one catenary cable to each of said support poles; (3) securing the other end of each of said catenary cables to the next adjacent arrangement of one of said support poles with a catenary cable secured thereto, to form a closed roof-supporting framework disposed within the space bounded by the surface of the ground and said support poles; (4) raising to an elevated position below said cable framework, and within the space bounded by the surface of the ground and said framework, a closed loop of cable having a perimeter equal to the perimeter of the roof to be erected; (5) securing spaced portions of said roof-defining cable to said roof-supporting framework to dispose said roof-defining cable in the general form of a polygon; (6) pulling successive panels of mesh material over said roof-defining cable on one side of the generally polygonal area outlined by said latter cable and across to the opposite side of said area; (7) pulling said panels over the roof-defining cable on said opposite side to drape the panels down to the ground, thereby forming a portion of the walls and roof of the aviary structure being erected; and (8) securing the edge portions of said panels of mesh material to each other and to the surface of the ground to form an enclosed aviary.

31. The method of claim 30 which includes the step of securing the end of a short support cable to a portion of said roof-defining cable and the other end of said short support cable to the one of said support poles in closest proximity to said portion of the roof-defining cable, each of said support cables thereby supporting one corner of the generally polygonally shaped roof of the aviary structure being erected.

32. The method of claim 30 which includes the step of securing one end of at least one adjustment cable to a portion of said roof-defining cable intermediate the corners of the generally polygonally shaped roof-defining cable, and securing the other end of said adjustment cable to one of said catenary cables of said roof-supporting framework.

* * * * *